United States Patent [19]

Murakami

[11] 4,227,777
[45] Oct. 14, 1980

[54] LIQUID CRYSTAL DISPLAY CELL

[75] Inventor: Tomomi Murakami, Higashiyamato, Japan

[73] Assignee: Citizen Watch Company, Limited, Tokyo, Japan

[21] Appl. No.: 873,961

[22] Filed: Jan. 31, 1978

[30] Foreign Application Priority Data

Feb. 3, 1977 [JP] Japan ................................. 52-11944

[51] Int. Cl.³ ............................................. G02F 1/133
[52] U.S. Cl. ...................... 350/334; 368/242
[58] Field of Search ............... 350/331, 334, 337, 339; 58/4 A, 50 R, 152 B, 152 E

[56] References Cited

U.S. PATENT DOCUMENTS

| | | | |
|---|---|---|---|
| 3,922,842 | 12/1975 | Fujita | 350/331 X |
| 4,035,060 | 7/1977 | Tsunoda et al. | 350/337 X |
| 4,068,926 | 1/1978 | Nakamura et al. | 350/337 |
| 4,139,271 | 2/1979 | Yoda | 350/337 |
| 4,140,378 | 2/1979 | Serzuki et al. | 350/331 X |

*Primary Examiner*—Edward S. Bauer

[57] ABSTRACT

In a liquid crystal display cell having an upper polarizing plate and at least two lower polarizing plates each of a different color, with the liquid crystal display portion being divided into display segment blocks of different colors, a structure of a multicolor liquid crystal display cell characterized in that a non-transparent member is integrally disposed on a transparent member that is used to construct the liquid crystal display cell and stacked on the boundary line between colors of adjacent display segment blocks so as to cover said boundary line.

3 Claims, 3 Drawing Figures

LIQUID CRYSTAL DISPLAY CELL

This invention relates to a multicolor liquid crystal display cell structure for use in an electronic wristwatch or the like.

In the past, liquid crystal display cells involved a number of problems related to contrast, power consumption, durability and extended use. However, improvements in liquid crystal compositions and driving methods have made the practical application of such cells possible. Nevertheless, conventional displays posed still other problems relating to organization of the display design. In wristwatches where hours, minutes, seconds, day, date and month, as well as an alarm mode mark and chronograph mode mark in multi-function wristwatches were arranged for display on a single surface, each display block had to be disposed extremely closely to its neighbor because of space limitations, a disadvantage which made is difficult to easily distinguish among the various display blocks and which proved inconvenient for individuals who had become accustomed to wearing the conventional analog-type timepieces. On the other hand, mono-color digital display systems have a tendency to be less interesting than those of the analog variety, and have not been able to satisfy the demand for timepieces a diversified designs and color tones.

In an effort to overcome the above-mentioned shortcomings, there have been proposed multicolor liquid crystal display cells which allow display blocks to be readily distinguished. This is accomplished by making use of two or more polarizing plates which provide different colors in each display block. However, such a display cell simply possesses an arrangement of two or more polarizing plates merely to distinguish each item of information, and the boundary line between colors of adjacent display segment blocks can be seen through the surface of the display. This is an extremely unattractive condition that detracts from the overall design and commercial value of the wristwatch.

It is, therefore, an object of the present invention to provide a multicolor liquid crystal display cell which can overcome the shortcomings encountered in the prior art.

It is another object of the present invention to provide a multicolor liquid crystal display cell which possesses a superior design and a high commercial value.

These objects are attained by means of a unitary construction in which a non-transparent thin layer is formed on a transparent member such as the polarizing or glass plates that constitute a liquid crystal display cell and are stacked on the boundary line between colors of adjacent display segment blocks so as to cover the boundary line.

These and other objects, features and advantages of the present invention will become more apparent from the following description when taken in conjunction with the accompanying drawings, in which.

Figure 1:
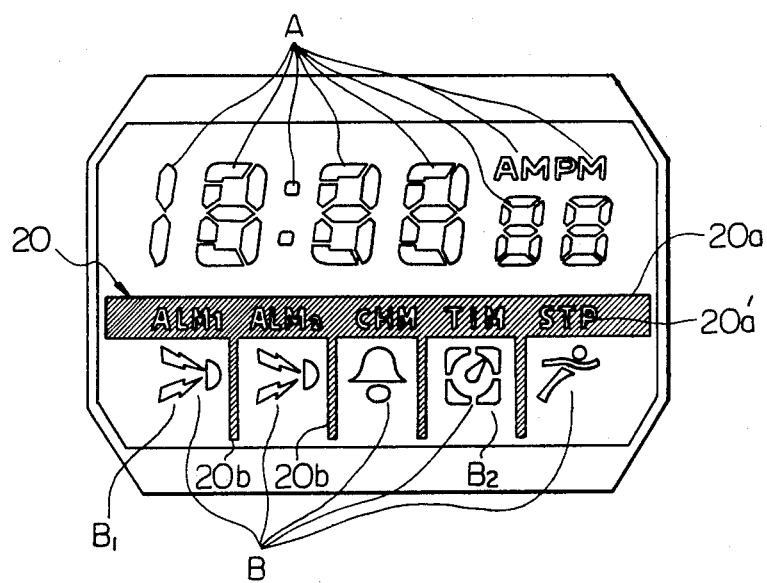
FIG. 1 is a plan view, as seen from the display side, of a preferred embodiment of a multicolor liquid crystal display cell according to the present invention.

In the drawings, a multicolor liquid crystal display cell comprises an upper glass plate 10 and a lower glass plate 12 between which a liquid crystal material is disposed, although not shown. Reference numeral 14 denotes an upper polarizing plate, 16 a lower polarizing plate having the same color as polarizing plate 14 but an angle of polarization that differs by 90°, and 18 a lower polarizing plate having the same polarizing direction as polarizing plate 16 but possessing a different color.

In FIG. 1 can be seen the various segments that are displayed by the liquid crystal cell, in which the display segment blocks are divided by thin film 20 of a non-transparent material into a display segment block A for displaying hours, minutes, seconds, AM and PM time information, and a display segment block B comprised of function mode marks which indicate the modes that relate to the information displayed in block A. The thin film or layer 20 may be disposed on one of the upper glass plate 10 and the upper polarizing plate 14 by printing a paint or any other suitable technique.

The relation between display segment blocks A and B is as follows. If, for example, the mark for the alarm mode in block portion $B_1$ of the display segment block B is being displayed, this means that the content of display segment block A is indicative of the time to which the alarm has been set. Similarly, if the symbol in block portion $B_2$ of the display segment block B is being displayed, this means that the wristwatch is in the timekeeping mode and that the time is as indicated in display segment block A in terms of hours, minutes and seconds.

Figure 2:
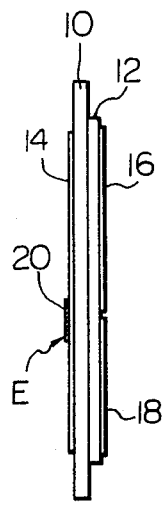
FIG. 2 is a side view of FIG. 1.
Figure 3:
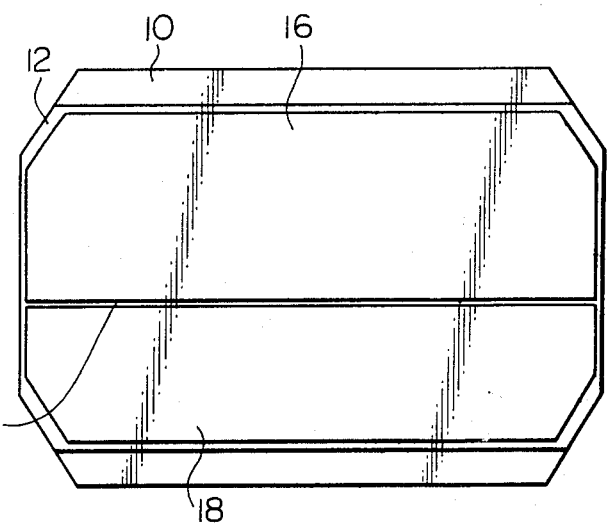
FIG. 3 is a rear view of FIG. 1.

The lower polarizing plates 16, 18 are disposed directly below display segment blocks A, B, respectively. In FIG. 2, it is shown that the thin film 20 is disposed on the top surface of upper polarizing plate 14 at a position corresponding to a boundary 22 between the differently colored lower polarizing plates 16, 18. In addition to the transparent upper polarizing plate 14, it is also possible to dispose a non-transparent member on the top surface of the transparent upper glass plate or bottom surface of the transparent lower glass plate by applying printing ink or pasting on a shielding plate.

In the present embodiment, a printing paint is formed in the shape of a frame about display segment block B and bears letters that indicate the meaning of each mode mark within block B. In other words, the paint is printed with characters ALM1, ALM2 for the alarm modes, CHM for a chime mode, TIM for the timer mode, and STp for a stop-watch mode. Adopting the above described structure that covers the boundary 22 which becomes visible when the blocks A and B are differently colored makes it possible to conceal this unattractive condition from the eye E of an individual wearing the wristwatch. In addition, the division between display segment blocks A and B is clearly defined by the frame-shaped nontransparent member and the meaning of each block is clearly indicated by the printed characters. Moreover, since the non-transparent member may be integrally disposed in advance on any of the transparent members such as the upper polarizing plate, upper glass plate or lower glass plate that constitute the liquid crystal cell, a separate partitioning plate need not be provided. In the case of a wristwatch, this eliminates the need to align a partitioning plate with respect to the liquid crystal cell and conserves space, allowing the thickness of the watch to be reduced.

A liquid crystal cell having a structure of the type described can be widely applied in multi-function timepieces and other types of devices. Moreover, the colored effect can be vividly enhanced by changing the colors of both the upper and lower polarizing plates. In the case of a multicolor liquid crystal cell having a plurality of boundary line between colors, such as in a timepiece where the color of each mode mark in display segment block B is of a different color, a non-transparent portion formed by printing or the like can be easily shaped into a complex frame-like configuration, an advantage that permits the realization of a multicolor liquid crystal display cell with an attractive design and a high commercial value.

While the present invention has been shown and described with reference to the particular embodiment by way of example, it should be noted that various other changes or modifications may be made without departing from the scope of the present invention.

What is claimed is:

1. A multicolor liquid crystal display cell comprising:
    a lower glass plate;
    an upper glass plate stacked above and secured to said lower glass plate in spaced relationship with respect to one another;
    an upper polarizing plate attached to said upper glass plate and covering a surface portion thereof;
    at least two lower polarizing plates each of a different color and attached to said lower glass plate and covering different surface portions thereof; and
    a thin layer of non-transparent material integrally formed on said upper polarizing plate at a position over and along a boundary line between said two lower polarizing plates to cover said boundary line, said thin layer comprising a printed paint layer and dividing a display surface of said display cell defined at the upper surface of said upper polarizing plate into first and second display blocks composed of a time display block and a function mode display block, respectively, and said thin layer including a plurality of characters idicating the display contents of said function mode display block.

2. A multicolor liquid crystal display cell according to claim 1, in which said function mode display block has means defining a plurality of function indicating marks.

3. A multicolor liquid crystal display cell according to claim 2, in which said thin layer comprises a strip extending along said boundary line, and a plurality of spaced segments laterally extending from said strip and sub-dividing said function mode display block and defining a plurality of spaces in which said plurality of fuction indicating marks are disposed respectively.

* * * * *